Figure 1:
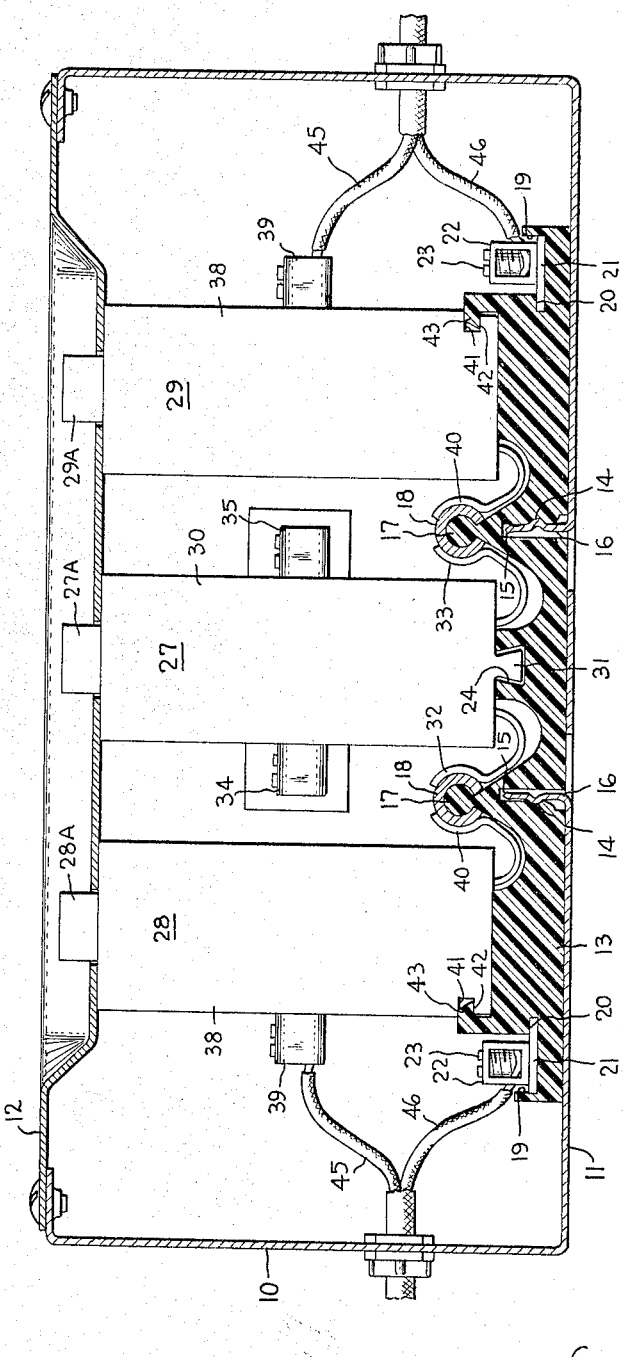

Oct. 11, 1966  G. L. GALANTE ETAL  3,278,807
PANEL ASSEMBLY WITH FRICTIONALLY HELD BUS BARS
Filed Feb. 19, 1963  2 Sheets-Sheet 1

INVENTORS
GEORGE L. GALANTE,
LEWIS W. JACOBS,
ROBERT J. SABATELLA
BY Robert T. Casey
ATTORNEY

United States Patent Office 3,278,807
Patented Oct. 11, 1966

3,278,807
PANEL ASSEMBLY WITH FRICTIONALLY HELD BUS BARS
George L. Galante, Plainville, Lewis W. Jacobs, West Hartford, and Robert J. Sabatella, Southington, Conn., assignors to General Electric Company, a corporation of New York
Filed Feb. 19, 1963, Ser. No. 259,675
8 Claims. (Cl. 317—119)

Our invention relates to electric circuit breaker panel assemblies, and particularly to circuit breaker panel assemblies for circuit breakers of relatively low amperage capacity, such as those used for the control of branch lighting and power circuits in the home and commercial buildings.

Electric circuit breaker panel assemblies or "load centers" of the type referred to, in accordance with the prior art and as widely used in residential and commercial applications prior to the present invention, commonly comprise an outer enclosure or box, and an inner supporting pan mounted within the box. A number of bus bars, such as two, are supported on the inner support or pan by suitable insulating means. The pan also includes means for supporting the individual circuit breakers which are to be used and for facilitating their connection to the bus bars.

The requirement for providing separate means for supporting the bus bars in insulated relation, and for supporting the circuit breakers with respect to the bus bars, contributes to the cost of the assembly. Moreover, panel assemblies of different capacities require different size supporting pans. Since there are a number of different sizes required, this adds considerably to the cost and difficulty of manufacture.

It is an object of the present invention to provide a circuit breaker panel assembly including single means for supporting the bus bars and the circuit breakers mounted thereon.

It is another object of the invention to provide such a panel assembly including supporting means which supports the "neutral" or return conductor connecting means as well as providing the functions of supporting the bus bars and the circuit breakers.

It is another object of the invention to provide an electric circuit breaker panel assembly including means which supports the bus bars and circuit breakers and which also includes means for supporting itself with relation to the outside or outer enclosure of the panel assembly.

It is a further object to the invention to provide bus bar and breaker supporting means for circuit breaker panel assemblies which can be manufactured in sections of indefinite length and cut to exact length as desired.

Other objects of the invention will in part become apparent, and in part be pointed out in the following detailed description, and the scope of the invention will be pointed out in the appended claims.

In accordance with the invention in one form, an electric circuit breaker panel assembly is provided including an outer rectangular enclosure or box. A generally rectangular base or body of resilient insulating material is supported against the back wall of the box by means of integral formations thereon which inter-engage cooperating formations carried by the back wall of the box or enclosure. The supporting base also includes a plurality of raised rib-like elongated projections each of which serves to support a slit tubular bus bar. A plurality of electric circuit breakers are also provided, each of which includes a portion adapted to inter-engage and interlock with a portion of the insulating base. Each circuit breaker also includes a resilient terminal portion adapted to resiliently electrically engage a portion of one of the aforesaid bus bars, whereby each circuit breaker may be mounted on the base and connected to a particular bus bar by simple plug-in action. The supporting base also includes a portion serving to support an elongated multiple type connector or "neutral bar" which extends along adjacent one end of the circuit breakers. Connection of the two wires of each branch circuit to be supplied by the assembly can therefore readily be made by connecting one wire thereof directly to a particularly circuit breaker terminal and by connecting the other or return wire to an adjacent terminal of the neutral conductor strip.

The insulating base is preferably made of uniform cross-section, whereby it can conveniently be manufactured such as by an extrusion process.

The invention will be more fully understood from the following detailed description, and its scope will be pointed out in the appended claims.

Figure 2:
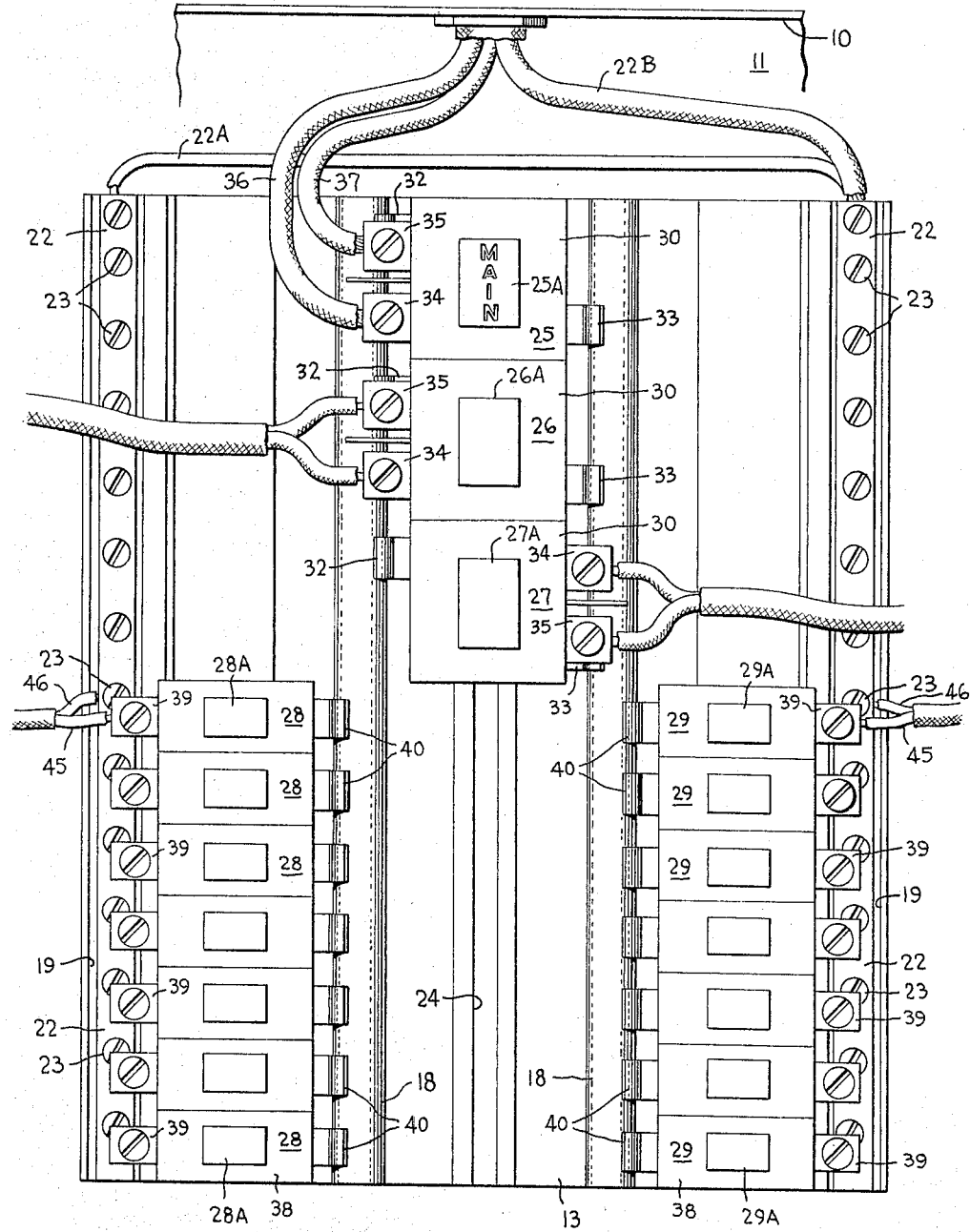

In the drawings,

FIGURE 1 is an end elevation view of an electric circuit breaker panel assembly incorporating the invention, portions of the outer enclosure being omitted, and FIGURE 2 is a top plan view of the interior assembly of an electric circuit breaker panel assembly of the type shown in FIGURE 1.

In the drawings, the invention is shown as incorporated in an electric circuit breaker panel assembly comprising an outer metallic box or enclosure 10 having a back wall 11 and a removable front or "trim" wall 12. A base or body 13 of suitably resilient insulating material is supported on the back wall 11 of the enclosure 10. The base 13 may be supported on the back wall 11 by any desired means. In a preferred form of the invention, however, the back wall 11 of the enclosure 10 is provided with gripping means 16 formed out of the back wall of the box 10 which extend into recesses 15 in the base 13. The base 13 is held in the enclosure 10 by resilient holding action of the formations 16 on the portions 14 of the gripping means 16.

The base 13, which is generally rectangular in outline, also includes a pair of elongated raised rib portions 17 projecting upwardly from its upper surface, each of the ribs or ridges 17, serving to support a semi-tubular conductive bus bar 18. The bus bars 18 are held on the ribs or ridges 17 by the resilience of the metal of the bus bar 18, combined with the resilience of the insulating material of the base 13.

The insulating base 13 is also provided with a recessed portion 19 along side each edge thereof, each of the recesses 19 having an undercut portion 20. Supported in each of the recesses 19 is a "neutral" conductor strap 21 having an elongated multi-connector terminal member 22 mounted thereon. The multiple connector 22 comprises an elongated hollow member of rectangular cross-section having a row of openings, not shown, along one side to receive the ends of wires, and a row of clamping screws 23 in the top wall thereof for clamping the wires to the connector.

The neutral connecting assemblies comprising the straps or bars 21 and the elongated hollow members 22 are retained in place on the base 13 by the resilient action of the material of the base, combined with the undercut construction 20.

The insulating base 13 also includes a vertically extending groove or channel 24 extending centrally thereof and downwardly from the top surface.

A plurality of electric circuit breakers are provided comprising double-pole circuit breakers 25, 26, 27, and two rows of single-pole branch connecting circuit breakers comprising breakers 28 and 29.

The circuit breakers 25, 26, and 27, are similar to each other in construction, and each includes a generally rectangular insulating casing 30, having a downwardly projecting rib 31 carried by the bottom wall thereof. The rib 31 is adapted to be received in the groove 24 of the base 13 in resilient gripping engagement to assist in holding the circuit breaker 27 in position.

The circuit breakers 25, 26, and 27 also each include a pair of resilient terminal connector members 32 and 33 adapted to contact the bus bars 18 when the breaker is in mounted position. In addition, each of the circuit breakers 25, 26, 27 includes a pair of screw-clamp type terminals 34, 35, positioned in side-by-side relation at one side of the circuit breaker, as may be seen in FIGURE 2. The bus bar terminals 32, 33 are positioned on opposite sides of the circuit breaker and in displaced relation, so as to be in position to resiliently contact the bus bars 18. The circuit breaker 27 is therefore, in effect, wedged between the bus bars 18, with the guide rib 31 in the groove 24.

The circuit breaker 25, in the embodiment shown herein, is utilized as a "main" circuit breaker, that is, the terminals 34, 35, are connected to incoming power conductors 36, 37. The power flow, therefore, is from the conductors 36, 37, through the main breaker 25, to the bus bars 18. The power is further fed from the bus bars 18, through the circuit breakers 26, 27 to their respective power utilization circuits, as well as through the two rows of circuit breakers 28 and 29, to their respective power consuming circuits.

It will be observed that the two-pole circuit breakers 25, 26, 27 may be mounted in either of two 180°-reversed positions, so as to place the terminals 34, 35 on the left, as in the case of circuit breaker 25, or on the right, as in the case of circuit breaker 27. Thus the position which is desired may be selected in accordance with the direction in which the power consuming cables are to be led out of the enclosure.

The single pole circuit breakers 28 and 29 are all substantially identical and also include generally rectangular insulating casings 38. The circuit breakers 28 and 29 also include clamping type load terminals 39 projecting from one side wall thereof, the resilient return-bent plug-in type bus bar contacting terminal members 40. The casings 38 include a recessed portion 41 providing a retaining lip or shoulder 42 which is adapted to be engaged under an overhanging projection portion 43 of the insulating base 13.

Each of the circuit breakers 28 and 29, is therefore mounted on the base 13 by interengaging the lip 42 with the overhanging projection 43, and rocking the breaker about this interengagement until the resilient connector 40 is snapped into resilient engagement with the corresponding bus bar 18. The breakers are held in this position by the resilience of the parts, and without the necessity for any further fastening operation. Each of the circuit breakers 28, 29 is connected to a branch power consuming circuit by means of an outgoing conductor 45. The return conductor 46 corresponding to each outgoing conductor 45, is connected to an adjacent point of the multiple connector assembly 22 as shown in the drawings. It will be observed that since the return or "neutral" connection may be made closely adjacent the corresponding line connection for each branch power consuming circuit, the amount of wire required is greatly reduced and the installation job is considerably simplified.

The circuit breakers 25, 26, and 27 include manually engageable operating handle members 25A, 26A and 27A respectively for manually operating the corresponding circuit breakers between on and off condition, and for resetting such circuit breakers following an automatic tripping or opening operation. Likewise, the circuit breakers 28 and 29 include manually operable handle members 28A and 29A for similar purposes.

The multiple connector members 22 are interconnected by a jumper conductor 22A, and both are connected to a main return or neutral conductor 22B.

The insulating base 13, it will be noted, is of uniform cross-section along its length. Because of this construction, the base 13 may be conveniently and inexpensively manufactured in relatively long sections or strips and then cut to whatever length is desired to accommodate a panel assembly of selected capacity. Because of this construction of the base 13, relatively low cost continuous manufacturing processes may be used, such for example, as roll-forming, or, more preferably, extrusion.

Materials used for the base 13 should have the following general characteristics: high thermal stability, non-flammability, good aging characteristics, good electrical insulating and arc-resistance characteristics, and high strength. Desirably, the material should also have good thermal conductivity and a degree of resilience higher than that of commonly used phenolic (wood-flour filled) materials, that is, a hardness of less than M90 on the "Rockwell" scale when tested acording to test method D-785-62 of the American Society for Testing and Materials, Philadelphia, Pennsylvania, adopted 1962.

A material which has been found suitable for such use is polycarbonate plastic designated "Lexan," manufactured and sold by the General Electric Company, Pittsfield, Mass.

It is an important feature of the subject invention that the large area of contact of the base 13 with the back wall 11 of the enclosure provides a good path for conducting heat from the bus bars 18, the breakers 27, 28, 29, and the multiple connectors 22 directly to the back of the box, from whence it is readily dissipated in the air. It is for this reason the good thermal conductivity is especially desirable.

It will be observed that there has been provided in accordance with the invention, a circuit breaker panel assembly including an insulating base which performs a number of functions which have required separate structural provision in previous designs, namely, (1) it holds the bus bars in position and supports them in the panel, (2) it helps to support the circuit breakers in the panel, and provides support for holding them in position with respect to the bus bars, (3) it supports the multiple connector assemblies used for the return or "neutral" conductors, supporting them closely adjacent the corresponding circuit breaker terminal, and (4) it provides its own fastening or mounting means with respect to the enclosure, so that no separate mounting means is necessary.

While the invention has been shown in only one particular embodiment, it will be apparent that many modifications thereof may be made, and we therefore intend by the appended claims to cover all such modifications as fall within the true spirit and scope of the invention.

What we claim as new and desire to secure by Letters Patent of the United States is:

1. An electric circuit controlling device panel assembly comprising:
 (a) a base of insulating material,
 (b) a pair of elongated electrically conductive bus bars supported in substantially parallel spaced apart relation on said base,
 (c) means supporting said bus bars on said base comprising elongated integral portions of said base having opposed wall surfaces engaging corresponding wall surfaces of said bus bars,
 (d) said base having a first elongated circuit control device retaining formation substantially midway between said bus bars and extending parallel thereto for receiving a portion of each of a plurality of circuit control devices when in mounted relation thereon,
 (e) said base having second elongated circuit control device retaining formations at the other side of each of said conductive bus bars and spaced therefrom,
 (f) whereby said panel assembly is disposed and arranged to receive and retain circuit control devices in three rows comprising a first row of devices disposed between said bus bars, and second and third rows of devices disposed at the outer sides of said bus bars respectively.

2. An electric circuit controlling device panel assembly as set forth in claim 1 wherein said assembly also comprises a generally rectangular outer enclosure of sheet metallic material, said base including integral formations thereon co-acting with integral formations on said enclosure to retain said base in mounted assembly in said enclosure.

3. An electric circuit controlling device panel assembly as set forth in claim 1 wherein said insulating base has a uniform cross-section along the length thereof whereby said base may be readily manufactured by continuous manufacturing process such as by extrusion.

4. An electric control device panel assembly comprising:
  (a) a base of insulating material,
  (b) at least one elongated busbar supporting portion integral with said base,
  (c) an electrically conductive busbar supported on said base, said busbar and said supporting portion of said base having frictionally interfitting portions retaining said busbar on said base and resisting movement of said busbar with relation to said base in all directions,
  (d) said panel assembly also comprising means for supporting a plurality of electrical circuit control devices on said supporting base in a row extending parallel to said busbar,
  (e) said busbar including contact portions along the length thereof for contact by correspondingly positioned contact portions of said circuit control device.

5. An electrical control device panel assembly comprising:
  (a) a generally planar base of insulating material,
  (b) at least one elongated conductive busbar supported on said insulating base,
  (c) retaining means integral with said insulating base extending longitudinally thereof in spaced apart generally co-planar relation with said busbar,
  (d) an electric circuit controlling device supported on said insulating base and including a first portion in retained engagement with said retaining means of said base and a second portion in resilient electrical contacting engagement with said busbar, whereby said control device is supported on said base by the combined action of said retaining means and said contacting engagement of said controlling device and said busbar,
  (e) said base of insulating material including at least one elongated busbar supporting portion integral therewith, said busbar and said busbar supporting portion having frictionally interfitting portions retaining said busbar on said base and resisting movement of said busbar with relation to said base in all directions.

6. An electric circuit control device panel assembly as set forth in claim 5, wherein said panel assembly also includes an elongated neutral conductor bar supported on said support in parallel spaced relation to said busbar and having means for connecting electrical conductors at a plurality of spaced points along the length thereof, said neutral conductor bar being retained on said support by resilient engagement with an integral portion of said support.

7. An electric circuit control device panel assembly comprising:
  (a) a generally planar support,
  (b) a pair of elongated conductive busbars supported in spaced apart parallel insulated relation on said support,
  (c) at least one two-pole electric circuit breaker supported on said support and positioned substantially entirely within the space bounded by said support and a pair of planes each of which extends perpendicular to said support and passes through the longitudinal centerline of one of said busbars, and having each of the poles thereof connected to one of said busbars respectively,
  (d) at least one single-pole circuit breaker supported on said support at the outer side of each of said busbars substantially entirely outside of said space, and,
  (e) means connecting each of said single-pole circuit breakers to the busbar adjacent thereto respectively.

8. An electric circuit control device panel assembly as set forth in claim 7 wherein said support also includes means carried thereby between said busbars mechanically retaining said two-pole circuit breakers in mounted position on said support, and means carried thereby at the outer portion of said base in spaced relation to each of said busbars retaining said single pole circuit breakers in place.

References Cited by the Examiner

UNITED STATES PATENTS

| | | | |
|---|---|---|---|
| 2,766,405 | 10/1956 | Edmunds | 317—119 |
| 2,767,353 | 10/1956 | Kingdon | 317—119 |
| 3,155,445 | 11/1964 | Johnson | 317—119 |
| 3,174,078 | 3/1965 | Koenig | 317—119 |
| 3,213,327 | 10/1965 | Norden | 317—119 |

ROBERT K. SCHAEFER, *Primary Examiner.*

KATHLEEN H. CLAFFY, *Examiner.*

H. J. RICHMAN, W. C. GARVERT,
*Assistant Examiners.*